United States Patent
Lauterbach et al.

(10) Patent No.: US 7,206,970 B1
(45) Date of Patent: Apr. 17, 2007

(54) SYSTEM AND METHOD FOR DIAGNOSTICS EXECUTION AND DATA CAPTURE IN A STORAGE SYSTEM USING NONVOLATILE MEMORY

(75) Inventors: R. Guy Lauterbach, Penn Valley, CA (US); John Marshal Reed, Morgan Hill, CA (US); Michael J. Tuciarone, Cupertino, CA (US)

(73) Assignee: Network Appliance, Inc., Sunnyvale, CA (US)

(*) Notice: Subject to any disclaimer, the term of this patent is extended or adjusted under 35 U.S.C. 154(b) by 589 days.

(21) Appl. No.: 10/072,140

(22) Filed: Feb. 7, 2002

(51) Int. Cl.
*G06F 11/00* (2006.01)
(52) U.S. Cl. ............................ 714/36; 713/2
(58) Field of Classification Search ............... 714/36; 713/2
See application file for complete search history.

(56) References Cited

U.S. PATENT DOCUMENTS

| | | | | |
|---|---|---|---|---|
| 5,463,766 A | * | 10/1995 | Schieve et al. | 713/2 |
| 5,819,292 A | | 10/1998 | Hitz et al. | |
| 5,956,475 A | * | 9/1999 | Burckhartt et al. | 714/23 |
| 5,963,962 A | * | 10/1999 | Hitz et al. | 707/202 |
| 5,974,546 A | * | 10/1999 | Anderson | 713/2 |
| 6,012,130 A | * | 1/2000 | Beyda et al. | 711/173 |
| 6,014,744 A | * | 1/2000 | McKaughan et al. | 713/2 |
| 6,038,570 A | | 3/2000 | Hitz et al. | |
| 6,189,114 B1 | * | 2/2001 | Orr | 714/25 |
| 6,477,482 B1 | * | 11/2002 | Maupin et al. | 702/183 |
| 6,625,754 B1 | * | 9/2003 | Aguilar et al. | 714/15 |
| 6,701,464 B2 | * | 3/2004 | Austen et al. | 714/48 |
| 6,763,456 B1 | * | 7/2004 | Agnihotri et al. | 713/2 |
| 6,785,807 B1 | * | 8/2004 | Aguilar et al. | 713/2 |
| 6,807,643 B2 | * | 10/2004 | Eckardt et al. | 714/36 |
| 2004/0049627 A1 | * | 3/2004 | Piau et al. | 711/103 |
| 2004/0221194 A1 | * | 11/2004 | Denninghoff et al. | 714/11 |

OTHER PUBLICATIONS

U.S. Appl. No. 10/071,790, filed Feb. 7, 2002, Reed et al.
David Hitz et al. TR3002 File System Design for a NPS File Server Appliance published by Network Appliance, Inc.

* cited by examiner

*Primary Examiner*—Scott Baderman
*Assistant Examiner*—Paul F. Contino
(74) *Attorney, Agent, or Firm*—Cesari & McKenna, LLP

(57) ABSTRACT

The present invention provides a system and method for diagnostics execution in which diagnostics code is stored in a designated partition on a removable nonvolatile memory device, such as a compact flash or a personal computer (PC) card that is interfaced with the motherboard of a file server system. The file server system firmware is programmed in such a manner that, upon receipt of a diagnostics command, a normal boot mechanism is interrupted, and a diagnostics boot is performed. The firmware is programmed to probe the removable nonvolatile memory device, and to load the diagnostics code contained thereon into main memory and to execute the diagnostics in response to an initiation by an operator's key sequence. Data produced as a result of the diagnostics test sequence is captured and stored in a maintenance log in another partition on the nonvolatile memory.

41 Claims, 5 Drawing Sheets

SYSTEM AND METHOD FOR DIAGNOSTICS EXECUTION AND DATA CAPTURE IN A STORAGE SYSTEM USING NONVOLATILE MEMORY

RELATED APPLICATION

This application is related to U.S. patent application Ser. No. 10/071,790 filed on Feb. 7, 2002 now issued as U.S. patent application Ser. No. 10/071,790 filed on Feb. 7, 2002 entitled METHOD AND SYSTEM TO QUARANTINE SYSTEM SOFTWARE AND CONFIGURATION by John Reed, et al., the teachings of which are expressly incorporated herein by reference.

FIELD OF INVENTION

The present invention relates to networked storage systems and, more particularly, to data storage systems including file servers and diagnostics for such systems.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file is extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that implements file system semantics and manages data access. In this sense, Data ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

Internally, the filer is a microprocessor-based computer in which one more microprocessors are interconnected by a system bus to various system components that may be physically located on a motherboard and which include a memory, having a buffer cache for storing data and commands, a network adapter for communicating over the LAN or another network, a firmware storage device such as an erasable programmable read only memory (EPROM— which may comprise a flash memory, that retains power during shutdown), that contains system firmware (including a boot mechanism), and various storage adapters for communicating with the storage volumes of the disk array attached to the filer.

In particular, the system firmware provides the basic initial inputs to the microprocessor so as to boot the computer. This process shall be broadly termed a "boot mechanism." At power-on, when boot-up occurs, the boot mechanism, stored in the firmware, is responsible for initializing memory, establishing various hardware connections, and performing certain power-on self-tests (POSTs). The boot mechanism, if all is functioning properly, then enables initial access to the stored copy of the storage operating system kernel so that it may be loaded into the filer memory. When appropriate, the storage operating system comes on-line and takes over filer operations. Upon shutdown, the boot mechanism is responsible for taking over from the storage operating system as the shutdown operation occurs. The boot mechanism provides the final steps before a restart ("boot-up") of the filer.

From time to time, instead of a normal boot-up, a diagnostics boot is executed in the filer, either as routine maintenance check to verify normal operation of the hardware components in the system, or alternatively, to diagnose and correct problems that may arise during operation. In addition to troubleshooting problems, it may be, for example, that a new network adapter or storage adapter card is being added in a scalable system to accommodate additional clients. Alternatively, additional disks or volumes may be added for an expansion of the system. Each of these new devices or functions needs to be configured and checked when it is brought on-line. Other new hardware components may also be added to replace faulty components or to upgrade the system. These new components need to be configured, checked and synchronized with the preexisting system. Diagnostics are employed to perform various checks in connection with these exemplary tasks.

According to one conventional approach, the diagnostics code for a diagnostics boot is contained on a floppy disk or CD ROM which is inserted into the computer by a maintenance operator at boot-up. In this manner, the diagnostics program is run and the results are observed in real-time. One drawback to such an approach is that the filer may be part of a distributed network in which the subject filer is remote (possibly in another city) with respect to the operator's local site.

As an alternative, the diagnostics routine has been placed directly on the on-motherboard EPROM (or onboard flash) that contains the firmware boot mechanism. However, there are several drawbacks to this approach. First, a conventional on-motherboard firmware EPROM may be limited in storage size. In one example, a typical Original Equipment Manufacturer (OEM)-supplied onboard flash for storage of firmware is only about 0.5 Mbytes in size. This limits the amount of information with respect to diagnostics that can be stored.

In addition, the placement of a diagnostics routine on the firmware that also contains the boot mechanism can present risks. It is often desirable to update diagnostic routines. However, commingling the diagnostics routine and boot mechanism on the same reprogrammable medium may increase risk of corruption of the boot mechanism during an attempt to update the diagnostics. More specifically, the EPROM provided from the manufacturer of the motherboard often includes memory that is already segmented, and if one were to attempt to add code or to rewrite code, then a whole sector of the memory may have to be erased which could compromise other aspects of the programming. While a partitioning of the firmware EPROM could alleviate some risks associated with commingling the boot mechanism with the diagnostics, the size and configuration of a conventional on-motherboard EPROM make this impracticable.

Moreover, during diagnostic sessions, the results produced in the tests being run (e.g., a diagnostics log) may be available to the operator in real-time, but they are often not saved. As such, valuable "error code" information that may have been displayed is often lost. It would be advantageous to maintain a record of diagnostics log data, configuration information, component operating characteristics, and the like, during and after diagnostic procedures. Again, the size of the EPROM dictates that such a log typically (if at all kept) resides in disk storage. Thus, the accessibility of the log could be compromised in the event of a disk failure or other circumstance.

Finally, the presence of diagnostics in conjunction with the firmware of the boot mechanism means that upgrades or changes to the underlying diagnostics must occur generally at boot-up. There is, again, significant risk in attempting to write to the media that stores the boot mechanism during runtime. The need to rely on a reboot to effect change to the diagnostic code thereby (or read a diagnostic log) causes further delays in the start of normal file service and interrupts its continuity.

Accordingly, it is an object of this invention to provide an alternate storage location for the diagnostics code and an associated log of diagnostics information that can be accessed readily during runtime and does not jeopardize, or interfere with, the integrity of the boot mechanism or other basic filer on-board functions. This mechanism should enable a relatively large capacity routine to be stored and a relatively large capacity log to be maintained. This log should be accessible readily during runtime and the diagnostics should be upgradable by a variety of techniques at convenient times that do not unduly interrupt file service.

SUMMARY OF THE INVENTION

The disadvantages of the prior art are overcome by providing a diagnostics system in which the diagnostics code is stored in a removable nonvolatile memory device, such as a compact flash or a PC card. The removable nonvolatile memory device is a relatively large-capacity, separate memory component that interfaces with, but is not an integral part of the motherboard and is physically connected to the motherboard via an interface device. The removable nonvolatile memory device appears to the processor as a generalized discrete storage device. A port for this type of connection can be built into a motherboard, and as such, the removable nonvolatile memory device can be readily coupled to a third party-manufactured motherboard.

When the diagnostics code is to be rewritten, upgraded or patched, this can be easily accomplished via an I/O operation performed directly with the removable non-volatile memory device. Thus, there is no need to write, undesirably, to the boot mechanism firmware. In addition, upgrades can be performed without taking the file server out of service. In other words, the diagnostics code that resides on the removable nonvolatile memory device can be readily changed, upgraded or patched by directly transmitting via the I/O interface (for example, a southbridge device) of the removable nonvolatile memory device. These upgrades can be performed while the underlying filer is in operation, thus without undesired file service downtime.

In accordance with one aspect of the invention, the boot mechanism firmware includes a command line interface programmed so that the firmware's normal boot mechanism may be interrupted by a user-initiated command (or a computer-initiated command) to run a diagnostics boot, instead of a normal boot. When this command is received, the firmware is programmed to probe the removable nonvolatile memory device, and to load the diagnostics image contained thereon into main memory, and to execute the diagnostics routine instead of the normal boot routine.

Internally, the removable nonvolatile memory device is divided into several memory partitions, each of which appears to the filer as a separate "drive." In an illustrative embodiment, the diagnostics code is written into one of the partitions. Another partition is designated to contain a maintenance log of diagnostic test results. The removable nonvolatile memory device is readily partitionable, unlike typical on-board EPROM.

In accordance with a further aspect of the invention, the data produced as a result of the diagnostics test sequence is captured, stored and continuously updated in the maintenance log located in one partition of the removable nonvolatile memory device. Such diagnostics log data can be readily retrieved (during filer runtime, for example) for interpretation at a later time. Advantageously, the removable nonvolatile memory devices retain their state during power-off or physical removal from the filer, thereby inherently providing disaster recovery protection and transportability to a properly functioning filer.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

I. Storage System Environment

Figure 1:
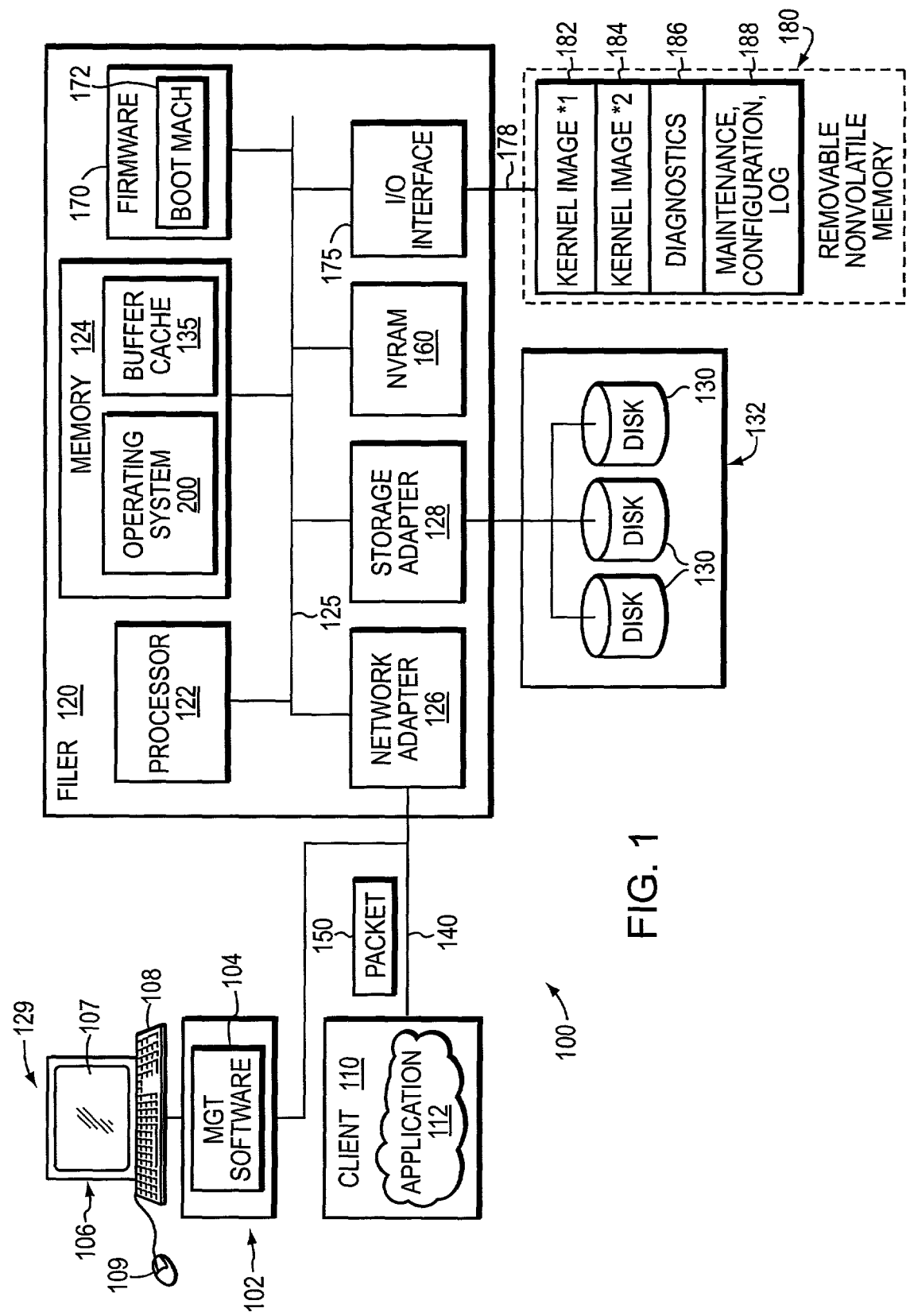
FIG. 1 is a schematic block diagram of a networked storage system embodying the present invention.

By way of further background, FIG. 1 is a schematic block diagram of a storage system environment 100 that includes a client 110 having one or more applications 112, and an interconnected file server 120 that may be advantageously used with the present invention. The filer server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. A console or other user interface 129 is provided to control various filer functions, including those implemented according to this invention, and report on the status of filer operations.

It will be understood to those skilled in the art that the inventive technique described herein may apply to any type of special-purpose computer (e.g., file serving appliance) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. Additionally, the teachings of this invention can also be used for executing diagnostics software on a variety of networking devices, including network caching devices, such as proxy cache servers. The term "storage system" should, therefore, be taken broadly to include such arrangements.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The memory comprises a form of random access memory (RAM) that is generally cleared by a power cycle or other reboot operation (e.g. it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In one exemplary filer implementation, the filer 120 can include a nonvolatile random access memory (NVRAM) 160 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

As will be described in detail below, the Filer 120 also provides a I/O interface 175 connected to a removable non-volatile memory device according to an illustrative embodiment of this invention. In an illustrative embodiment, the I/O interface can be a southbridge device, which is well-known in the art.

Connected to the LAN 140 may be a station using which a maintenance operator can interface with the system. A management station 102 can include a server or PC-based computer in a console 129 with a network interface for communicating over the LAN 140. Within the management station 102, resides appropriate management software 104. A graphical user interface (GUI) 106 may include a display 107, a keyboard 108 and a mouse 109 so that a maintenance operator can enter commands into the system.

In an illustrative embodiment, the disk array 132 is arranged as a plurality of separate volumes each having a file system associated therewith, as described further. The volumes each include one or more RAID groups of disks 130. In one embodiment, the RAID groups can each include independent physical disks 130 including those storing striped data and those storing separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

II. Storage Operating System

To facilitate generalized access to the disks 130 on the array 132, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics (such as the above-referenced WAFL) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
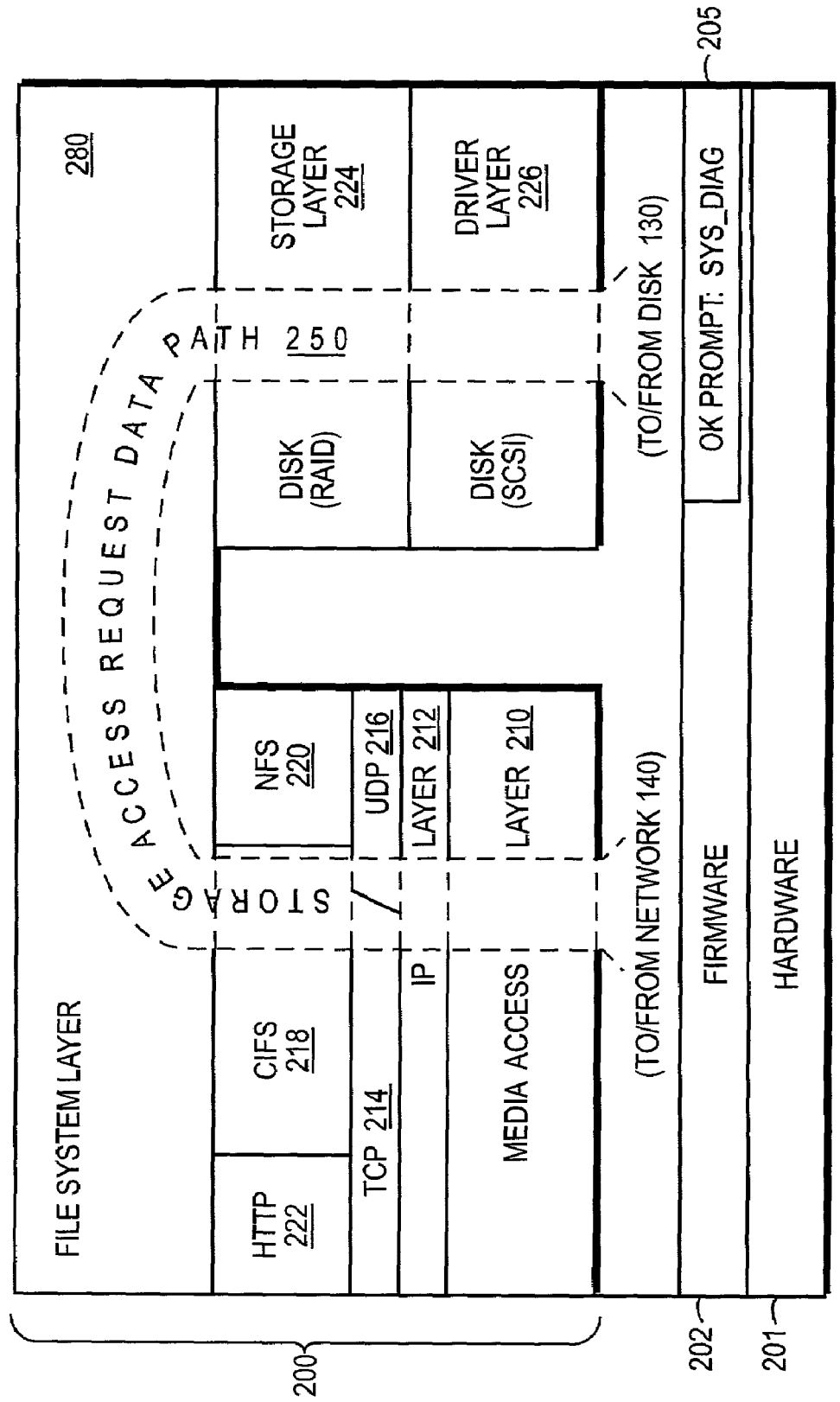
FIG. 2 is a schematic illustration of the interconnection between the hardware, firmware and the storage operating system of a filer in accordance with the present invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of is software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a RAID protocol, and a disk driver layer 226 that implements a disk access protocol such as, e.g., a Small Computer Systems Interface (SCSI) protocol.

Bridging the disk software layers with the network and file system protocol layers is a file system layer 280 of the storage operating system 200. Generally, the layer 280 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the Common Internet File System CIFS specification, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110.

The firmware 202 is shown in connection with the storage operating system 200 residing beneath the disk layer (FIG. 2). The firmware 202 thus interacts with the disks and operating system in a manner to be described further below. A firmware storage device 170 (FIG. 1) is operatively interconnected with the filer's (120) components. The firmware 202 residing in the firmware storage device 170 includes a basic instruction set stored on a nonvolatile memory, such as a flash memory, and includes a boot mechanism 172.

For purposes hereof, the term "boot mechanism" shall in general include any mechanism, whether implemented in hardware, firmware, software or a combination thereof, for controlling boot-up and reinitialization of a file server. Also, while the firmware is stored in a nonvolatile memory component, it is expressly contemplated that it can reside in a variety of other filer-accessible locations and in a variety of forms (such as a backup hard drive, optical storage, magnetic tape, etc.)

A bus interface (not shown) allows the firmware to communicate over the system bus 125. This bus interface can be based on a variety of protocols, such as a Peripheral Component Interface (PCI) standard or Integrated Device Electronics (IDE) standard. Notably, the firmware provides the most-basic instruction set to start a cold (uninitialized and/or powered-down) system, and to perform the final steps in bringing-down the system when a more-comprehensive instruction set (in the form of a storage operating system kernel) is not present.

In accordance with the invention, an I/O interface 175 is connected to the system bus 125 of the motherboard of the filer 120. An ISA bus 178 couples a removable non-volatile memory device 180 to the system I/O interface 175. As used herein, the term "removable nonvolatile memory device," broadly stated, shall include a large capacity memory device (typically 4–8 MB or more memory storage capacity, and up to about 128 MB, or more) with a storage capacity that is high when compared to a typical firmware storage medium (which is often 512 KB of storage memory), and this removable non-volatile memory device should be readily partitionable into separate memory segments that may represent separate drives (e.g., that may have associated drive letters such as E:, F: and G:, etc.), and as such, accessing one "drive letter" does not directly impact data storage on other drive letters/partitions. According to this definition, the removable non-volatile memory device may be readily removable without loss of stored information. However, actual ease of removability may be limited due to filer construction architecture and the like. In addition, conventional controllers can be employed to operate the partitioned drives as IDE-based components and to provide error checking and recovery.

In accordance with one aspect of the invention, the removable nonvolatile memory device is a compact flash 180. The compact flash 180 appears as an IDE drive device to the firmware 202 when the filer 120 powers on. As noted earlier, other types of removable nonvolatile memory devices may also be employed, but in the interest of brevity, we refer to the compact flash 180 in this description of an illustrative embodiment.

The compact flash 180 is divided into a number of logical memory partitions. In the illustrative embodiment, the compact flash 180 has four partitions. The first partition 182 contains the kernel image of the storage operating system being used in the particular application. The second partition 184 includes a backup copy of the kernel image. Details regarding storing, on the compact flash, the storage operating system kernel, upgrading the storage operating system code, and copying the last known good version of the storage operating system into another partition on the compact flash are set forth in commonly-owned U.S. patent application Ser. No. 10/071,790 filed on Feb. 7, 2002 now issued as U.S. patent application Ser. No. 10/071,790 filed on Feb. 7, 2002 of John Reed et al.

The diagnostics code is preferably written into a third partition 186, and the diagnostics log is stored in the fourth partition 188 of the compact flash 180. It should be understood that the partitioning may be arranged in various configurations while remaining within the scope of the present invention.

In one embodiment of the invention, a 32 megabyte (MB) PC card may be employed. However, there are a number of available compact flash devices and PC card sizes, and the appropriate device size for a particular application may be selected. Other types of removable nonvolatile memory storage devices can also be employed to store the diagnostics image if desired in a particular application, such as magnetic memory units and optical memory units.

The removable nonvolatile memory device allows replacement of the component without compromising storage operating system or filer data integrity. The component may be quickly and easily removable if is determined by an appropriate operator that replacement is desired. But, the use of a compact flash or PC card allows for ready updates or rewriting of code without the necessity of writing to the boot flash, which is undesirable. It is also provides a built-in disaster recovery mechanism in that in the event of a power loss, the compact flash or other removable nonvolatile memory device retains its contents, even upon power-off. This cannot always occur when using a floppy disk or a CD-ROM, and/or with out involving the on-board flash.

The kernel image 182 that is resident on the compact flash 180 constitutes the operating system 200 that is loaded into the memory 124. However, it is also contemplated that more than one compact flash component or PC card may be employed in certain instances. For example, the operating system kernel or back up copy may be stored on one component, and the diagnostics on another, while remaining within the scope of the present invention.

As in any computer, it is desirable in the storage system environment to maintain the highest standards in keeping the system in excellent working order and in diagnosing and quickly fixing problems that arise in the operating system 200, the hardware 201, and the firmware 202. For this reason, the system is provided with diagnostics software for verifying the operation of various hardware components and for troubleshooting problems that may arise during operation of these components.

Thus, diagnostic sequences are run from time to time on the system hardware. It is best to implement the diagnostics at a machine power on. For a better understanding of this aspect of the invention, we refer to the procedure 300 of FIG. 3, which illustrates the various paths that may be taken upon power-on. In general, the diagnostic is implemented at power-on instead of a conventional boot, by accessing the compact flash rather than the boot disk operating system, based upon firmware instruction to do so.

In operation, the system is powered-on or booted as illustrated in step 305. The system powers on and identifies devices as they power-up. Then, a normal boot sequence is started (step 310), and the code for this is housed in the system firmware storage device 170 (FIG. 1) that is typically resident on the motherboard. If the boot sequence passes an initial power-on self test, in accordance with step 312, then the normal boot sequence is executed (step 314), and the boot sequence is completed (step 316). The filer is then ready for processing file requests. These instructions may be implemented in hardware, firmware or software in the form of computer readable medium consisting of programming instructions executing on a computer.

If the system fails the power-on self-test (POST) (step 312), then an alternate path is chosen as indicated by step 320. The system operator or system programming may determine that an alternate boot should be carried out. At this point, the firmware probes the second partition 184 of the compact flash 180 for the backup kernel image. A boot from the second partition is attempted, (step 324). If it passes, then the normal boot sequence 326 is run and completed, (step 328). If an operator decides to boot from a disk (decision step 330), and this is successful, then, once again, the normal boot sequence is executed (step 332) and finished (step 334).

If either the boot from the second partition or the boot from the disk fails, the system proceeds to an OK PROMPT 340. More specifically, the system firmware is programmed in accordance with the invention in such a manner that if, during its normal boot routine, a diagnostics command is received at the command interface "OK prompt," then, in response, the firmware interrogates and scans all of the IDE-based devices on the system. The compact flash 180 (containing the diagnostics code in one of its partitions) will appear as an IDE, similar to a drive, such as the "E:" drive, on the system. The system firmware is further programmed to load the diagnostics image from the compact flash into main memory and then run the diagnostics code. As a result, the diagnostics code is executed.

Figure 3:
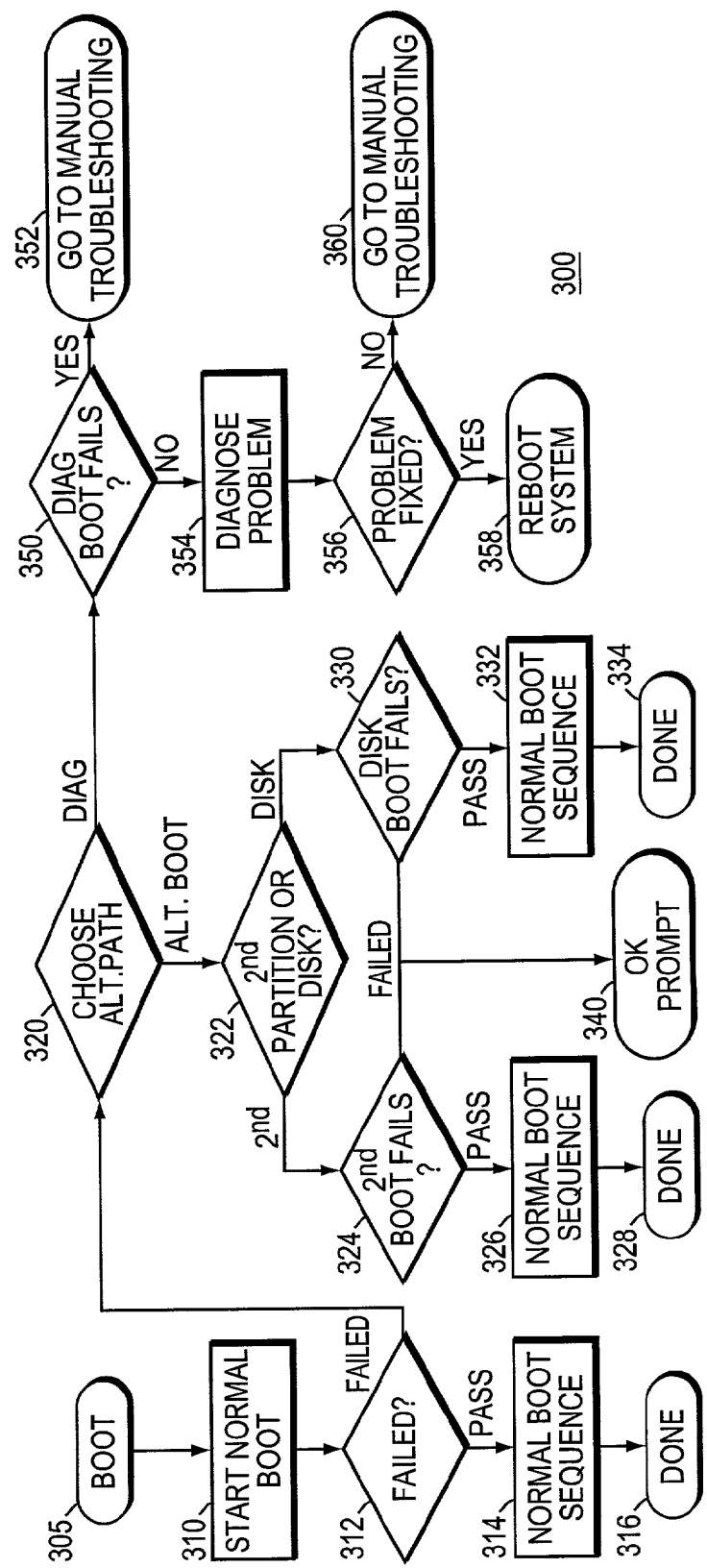
FIG. 3 is a flow chart illustrating the normal boot routine, a backup boot routine and the diagnostic routine as alternative paths in accordance with one aspect of the invention.

In the procedure of FIG. 3, the OK PROMPT 340 is the user interface to the system firmware 202, and this is also illustrated in FIG. 2 as element 205. At this prompt, the user may enter the command line "BOOT DIAG" and this notifies the firmware to proceed to the diagnostic boot which may be "run E:." The diagnostics image stored in the designated partition in the compact flash 180, such as the E: drive is loaded into memory and is executed. This is described in further detail with reference to FIG. 4.

Figure 4:
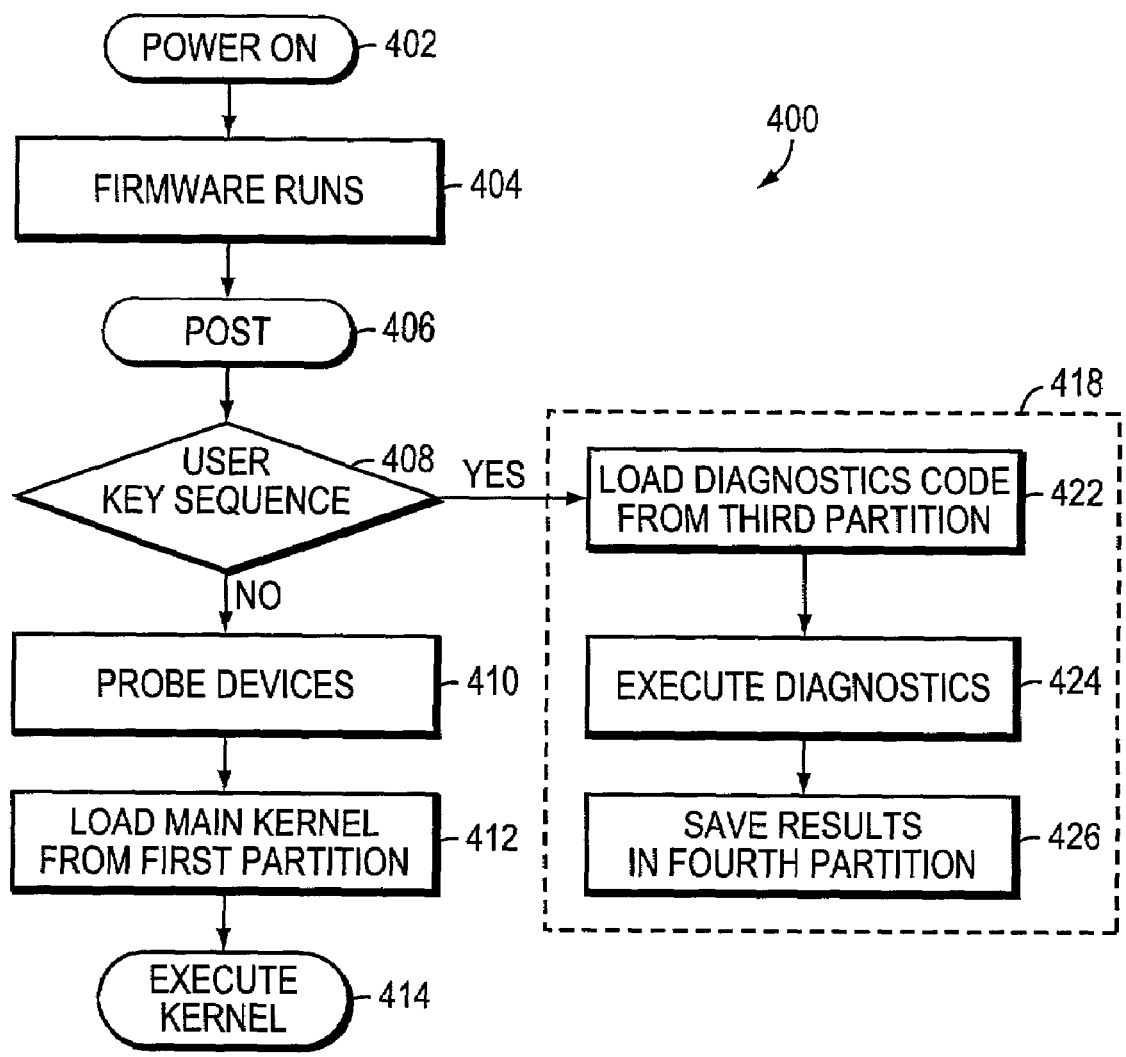
FIG. 4 is a flow chart illustrating the firmware steps taken to load and execute the diagnostics code in accordance with the invention.

In FIG. 4, the procedure 400 begins with the power on 402. The firmware 202 powers on, and begins running, as shown in step 404. The power-on self-test (POST) that precedes the normal boot sequence just discussed commences, as in step 406. If a diagnostic sequence is desired, the user will enter a key sequence at the maintenance station (or other appropriate interface) as in step 408. If no key sequence is entered, the devices are probed as the firmware looks for boot relevant devices and to determine what components are coming on-line as indicated by step 410. The firmware recognizes the existence of various components based upon its unique probes to the components. The main operating system kernel 182 (FIG. 1) is located and then loaded into main memory 124, as shown in step 412, and it is thereby executed, 414. This is a normal "C:" drive boot.

If the user enters the appropriate key sequence in step 408, the process continues with the diagnostic sequence 418. The firmware, as programmed, replaces the usual "C:" drive boot with a new "E:" drive boot. In this manner, the firmware looks at known fixed files in the partitions of the compact flash and in this instance accesses the diagnostic code for the diagnostic boot as an "E:" or similar drive directory.

More specifically, the firmware locates the third partition 186 of the compact flash 180, and copies the diagnostic code into the memory 124 (FIG. 1) in accordance with step 422. The diagnostics are executed as indicated in step 424. Results of the tests are captured and saved, (step 426), in the fourth partition 188 of the compact flash 180. It should be understood that the partitioning illustrated in the figures could be changed to include the code segments in a different order, or to include a different number of partitions, while remaining within the scope of the present invention.

In accordance with another aspect of the invention, the firmware can be programmed to automatically run a diagnostic boot process under certain circumstances, and this can occur without human intervention. Thus, as in FIG. 3, there may be a diagnostic boot that occurs upon a prescribed condition within the system, in such a case, the system proceeds down the path illustrated by step 324. If there is a diagnostic boot, and this boot fails, (step 350), then an operator would have to step in to go to manual trouble shooting, (step 352). If the diagnostic boot, just described, is successful, then the problem is diagnosed (step 354), and fixed (step 356), if possible and a reboot is initiated, (step 358). If the problem is not fixed in step 356, then an operator would begin manual trouble shooting in accordance with step 360 via the operator interface (FIG. 1).

Figure 5:
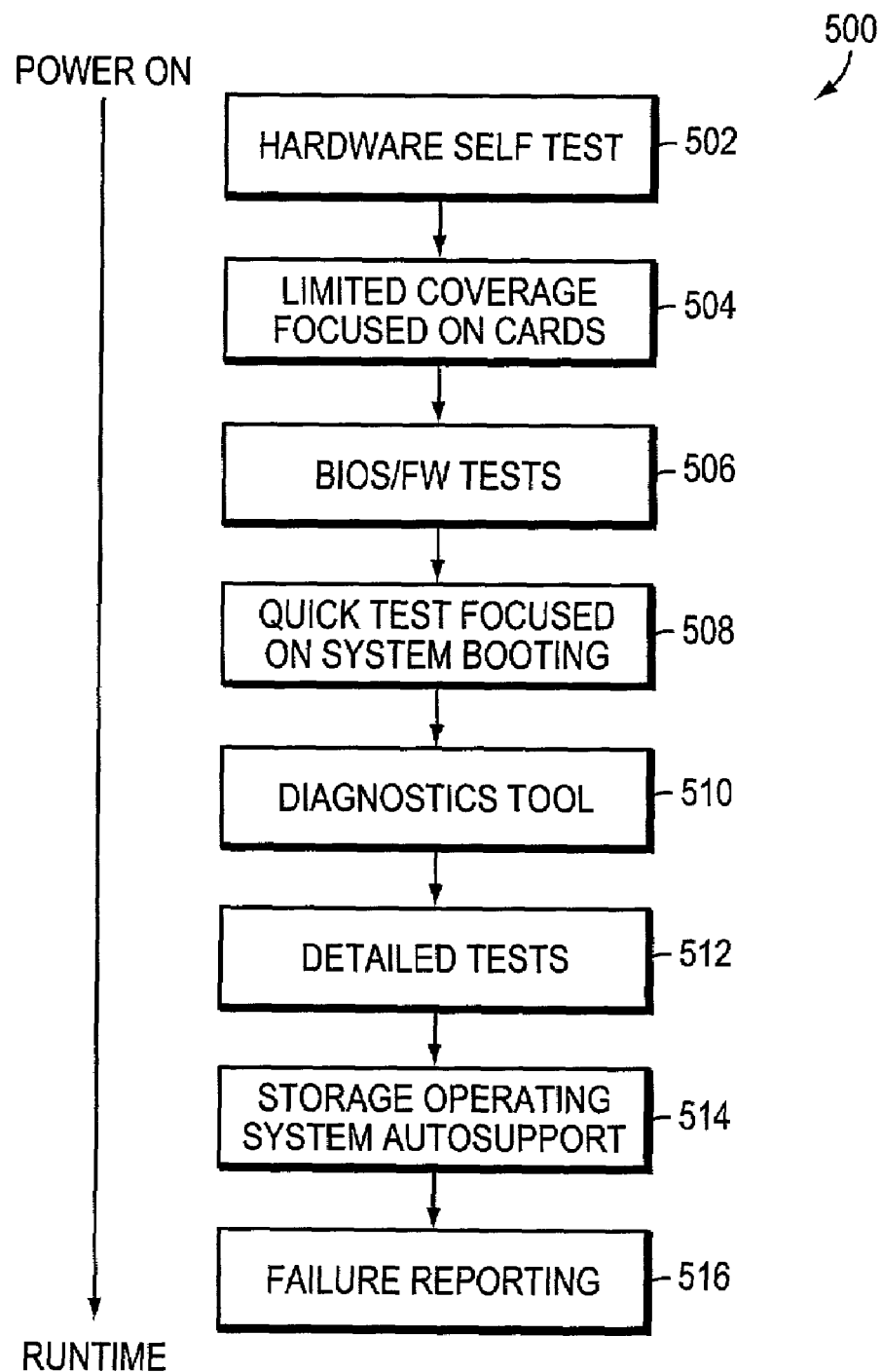
FIG. 5 is a flow chart illustrating the steps taken by a file system from power-on to runtime in accordance with an embodiment of this invention.

FIG. 5 illustrates flow chart 500 of the diagnostic test flow for the system from power-on to runtime. Beginning at power-on, (step 502), limited coverage is provided to determine if the cards interconnected to the motherboard or otherwise present in the system are provided as components power-on, (step 504). Once components are powered up, the firmware, or other similar software will test the components on the motherboard including the CPU 122, the memory 124, boot I/O interface, and will initialize the hardware in accordance with step 506. These are quick tests focussed on getting the system booted, (block 508). The diagnostics tool which is the code contained in the partition of the compact flash 180 begins to run and it includes expanded tests that focus on the memory, the I/O interface and devices, and the physical disks, (block 510). These are detailed tests that are conducted and they produce a plethora of information about the system, which is captured and stored, as illustrated by block 512.

In accordance with yet a further aspect of the invention, the test results, configuration information, maintenance information and other data in the log maintained on the compact flash, can be emailed or sent via the Internet or otherwise accessed by interested parties who are associated with and authorized within the system, through a supporting interface, known in the illustrative embodiment as the storage operating system AUTOSUPPORT 514, which is programmed to perform failure reporting, as illustrated in section 516 of the procedure 500. As noted, this system for capturing test results and reporting such data can occur without incurring system downtime. More specifically, while the diagnostics code is being executed, certain results are saved in the memory locations on the compact flash in the maintenance log partition. The results of the tests, and the operating characteristics or states of various components can be captured and stored in the compact flash for later interpretation by the computer or a human operator. In this way, the memory storage of the diagnostics information is out of the normal operating band of the system, that is, the diagnostics information is not commingled with customer information on disk.

Furthermore, implementing the diagnostics boot using the compact flash and firmware interface allows the diagnostics code to be upgraded and edited without system downtime, and without writing to an on board flash. Further, the storage of the diagnostics information is kept separate from customer information on disk. The storage operating system can write data and/or new diagnostics code to the removable nonvolatile memory device during the normal operation of the file server. As the removable non-volatile memory device is positioned, only the diagnostic partition needs to be accessed. Thus, in the event of a power failure or other accident, the other partitions would not be exposed to corruption or data loss. The compact flash is coupled to the processor ultimately by the I/O interface 175 in such a manner that the diagnostics code may be upgraded, using an associated I/O interface, without taking the storage system out of service.

Using a compact flash or PC card allows the diagnostics to reside in its own memory segment that does not involve utilization of memory resources and space on the motherboard. The choice of a compact flash or a PC card also allows for disaster recovery in that data saved thereon is retained during power off. Further, a PC card also contains code for remapping memory in the event one segment of memory fails, thus providing further back up.

The present invention provides a system for readily updating, executing and capturing diagnostics data using a removable nonvolatile memory device. The removable nonvolatile memory device can be replaced without compromising the storage operating system or filer data integrity. It is quickly and easily removable if is determined by an appropriate operator that replacement is desired. Updates, rewrites and patches can readily be performed without the necessity of writing to the boot flash, which is undesirable. As noted, the compact flash or PC card also provides a built-in disaster recovery mechanism in that if a power loss occurs, the compact flash or other removable nonvolatile memory device retains its contents even upon power-off. Moreover, many PC cards and compact flash devices contain code for remapping portions of memory should other portions of memory fail, thus providing additional protection. These advantages can be realized without needing a floppy disk or a CD-ROM, and with out involving the on-board flash.

The foregoing has been a detailed description of an illustrative embodiment of the invention. Various modifications and additions can be made without departing from the spirit and scope of the invention. For example, it should be understood that the partitioning of the removable nonvolatile memory device, or the command line interfacing could be altered and adapted for various applications while remaining within the scope of the present invention. Additionally, while the description of an illustrative embodiment has been written in reference to filers and file servers, the principles are equally relevant to all types of computers. It is expressly noted that network caching devices, such as proxy cache servers operatively interconnected with servers, clients and other networking devices can be utilized with the present invention. Accordingly, this description is meant to be taken only by way of example and not to otherwise limit the scope of the invention.

What is claimed is:

1. A storage server system having a processor and a memory, the storage server system comprising:
   (A) a storage operating system adapted to be executed by the processor;
   (B) a removable nonvolatile memory device coupled to a system bus, the removable nonvolatile memory device divided into a plurality of partitions including a first partition containing diagnostics code for the system and a second partition designated as a maintenance log into which test results and data are stored; and
   (C) a set of boot instructions resident in the storage server system including instructions for executing a normal boot routine upon a power-on of the system, and including instructions enabling the processor to identify the removable nonvolatile memory device and to load the diagnostics code into the memory in response to a command to execute a diagnostics boot routine instead of the normal boot routine, the command generated by the storage system upon a failure of the normal boot routine.

2. The system as defined in claim 1 further comprising:
   (A) an input/output device coupled to the system bus, and which input/output device is identifiable by the processor; and
   (B) a second bus coupled between the input/output device and the removable nonvolatile memory device in such a manner that when the processor identifies the input/output device, the removable nonvolatile memory device is, in turn, initialized and the diagnostics code is executed upon a command to run a diagnostics boot routine.

3. The system of claim 1 further comprising:
   (A) a storage adapter coupled to the system bus; and
   at least one storage disk coupled to the storage adapter and containing files served by the operating system.

4. The system as defined in claim 1 further comprising a motherboard upon which the processor, the memory and the set of boot instructions reside.

5. The system as defined in claim 4 wherein the removable nonvolatile memory device containing the diagnostics code is resident external to the motherboard, and the diagnostics code on the removable nonvolatile memory device is adapted to be upgraded or amended free of taking the system out of service.

6. The system as defined in claim 1 wherein said boot instructions reside in firmware.

7. A server system having a processor and a memory, the server system comprising:
   (A) a storage operating system adapted to be executed by the processor;
   (B) a removable nonvolatile memory device coupled to a system bus, the removable nonvolatile memory device divided into a plurality of partitions including a first partition containing diagnostics code for the system and a second partition designated as a maintenance log into which test results and data are stored by execution of the diagnostic code;
   (C) a set of boot instructions resident in the server system including instructions for executing a normal boot routine upon a power-on of the system, and including instructions enabling the processor to identify the removable nonvolatile memory device and to load the diagnostics code into the memory in response to a command to execute a diagnostics boot routine instead of the normal boot routine, the command generated by the storage system upon a failure of the normal boot routine;
   (D) a storage adapter coupled to the system bus;
   (E) at least one storage disk coupled to the storage adapter and containing files served by the operating system; and
   (F) a plurality of storage disks coupled to the storage adapter and data on the disks being stored in a write anywhere file layout system.

8. The system as defined in claim 7 wherein said diagnostic code includes code relating to the diagnostics of hardware devices including the processor, the memory, the bus, the adapter, the disks, a compact flash and interfaces thereof.

9. A method of performing diagnostics in a storage server system, the storage server system having a processor and a memory, the method comprising the steps of:
(A) providing a removable nonvolatile memory device interfaced with a mother-board, the removable nonvolatile memory device being identifiable to the processor;
(B) dividing the removable nonvolatile memory device into separate memory partitions;
(C) storing a set of diagnostics instructions, being a diagnostics code, in one of the partitions of the removable nonvolatile memory device;
(D) programming a system firmware to recognize a user implemented command entered through a command line interface, the command entered during the normal boot routine for a diagnostics boot such that in response to the diagnostics boot command, the firmware loads the diagnostics code residing in the removable nonvolatile memory device into the memory to execute a diagnostic boot routine instead of a normal boot routine; and
(E) maintaining, in a separate partition of the removable nonvolatile memory device, a maintenance log into which diagnostic test results data and data about the storage system are stored.

10. The method as defined in claim 9 including the further step of:
selecting as the removable nonvolatile memory device, a compact flash.

11. The method as defined in claims 9 including the further step of:
selecting as the removable nonvolatile memory device a personal computer (PC) card.

12. The method as defined in claim 9 including the further step of:
upgrading the diagnostics code without taking the storage server system out of service.

13. A storage system having a processor and a memory, the storage system comprising:
(A) means for storing a set of diagnostics instructions comprising diagnostics code, in a removable nonvolatile memory device coupled to a system bus, the removable nonvolatile memory device divided into a plurality of partitions including a first partition containing diagnostics code for the system and a second partition designated as a maintenance log into which test results and data are stored by execution of the diagnostic code; and
(B) means for executing the diagnostics code in response to a diagnostics boot command received by system firmware instead of the normal boot routine, the command generated by the storage system upon a failure of the normal boot routine.

14. The storage system of claim 13 further comprising:
means for coupling the removable nonvolatile memory device to the processor in such a manner that the diagnostics code may be upgraded without taking the storage system out of normal service.

15. The storage system of claim 14, further comprising:
means for upgrading the diagnostics code by interfacing with the storage system through an associated input/output interface.

16. A computer-readable medium operating on a computer in a network that includes one or more storage systems sharing volumes, the computer-readable medium including program instructions for performing the steps of:
(A) initiating a power-on self test when the computer is powered-on;
(B) identifying devices present in the computer;
(C) in response to a successful power-on self test, commencing a normal boot routine;
(D) recognizing a command for a diagnostics boot, the command generated by the storage system upon a failure of the normal boot routine;
(E) in response to the diagnostics boot command, probing devices to locate a removable nonvolatile memory device containing diagnostic boot instructions; a
(F) interrupting the normal boot routine and executing the diagnostics code for a diagnostics boot for the computer; and
(G) identifying a compact flash as the removable nonvolatile memory device, the compact flash divided into a plurality of partitions including a first partition containing diagnostics code for the system and a second partition designated as a maintenance log into which test results and data are stored by execution of the diagnostic code.

17. The computer readable medium as defined in claim 16 wherein the diagnostics boot command is initiated by a human maintenance operator.

18. The computer readable medium as defined in claim 16 wherein the diagnostics boot command is initiated as an instruction in the computer readable medium upon the occurrence of a predetermined event.

19. A diagnostic system for use with a storage system comprising:
a removable nonvolatile memory device interconnected with the storage system, wherein the removable nonvolatile memory device contains boot diagnostic code that is loadable into the storage system as an alternative to a normal boot routine when the storage system generates a command to boot diagnostic code upon a failure of the normal boot routine;
wherein the removable nonvolatile memory device includes a plurality of partitions including a first partition wherein the boot diagnostic code is contained and a second partition storing a diagnostic log for storage of diagnostic data by execution of the diagnostic code;
wherein the storage system further comprises a firmware boot routine, the firmware boot routine having a process for selecting between execution of either a normal boot routine or a diagnostic boot routine.

20. The diagnostic system of claim 19, wherein the removable nonvolatile memory device is a PC card.

21. The diagnostic system of claim 19, wherein the removable nonvolatile memory device is a compact flash.

22. The system of claim 21 further comprising:
a separate storage medium, the separate storage medium storing a boot routine.

23. The system of claim 22, wherein the separate storage medium is a partition on the removable nonvolatile memory device.

24. A server system having a processor and a memory, the server system comprising:
(A) a storage operating system adapted to be executed by the processor;
(B) a removable nonvolatile memory device coupled to a system bus, the removable nonvolatile memory device containing diagnostics code for the system, the removable nonvolatile memory device also divided into a plurality of partitions with the diagnostics code residing in at least one of the partitions; and (C) a set of boot instructions resident in the server system including instructions for executing a normal boot routine upon a power-on of the system, and including instructions enabling the processor to identify the removable nonvolatile memory device and to load the diagnostics code into the memory in response to a command to execute a diagnostics boot routine instead of the normal boot routine, the command generated by the storage system upon a failure of the normal boot routine;

wherein one of the partitions is designated as a maintenance log into which test results and data are stored.

25. A computer having a processor and a main memory, the computer comprising:
a non-removable non-volatile memory device containing a boot mechanism firmware, the boot mechanism firmware configured to provide a normal boot routine and select a first logical drive to boot from;
a command line interface configured to allow a user to enter a command to run a diagnostic routine;
a removable non-volatile memory device storing the diagnostic routine, a partition of the removable non-volatile memory device configured as a second logical drive, the boot mechanism firmware configured to, in response to the user's command, select the second logical drive to boot from and load the diagnostic routine into main memory; and
an additional partition of the removable non-volatile memory configured to store a maintenance log generated by the diagnostic routine.

26. The computer of claim 25 further comprising:
a file system for accessing logical drives, the file system configured to upgrade or modify contents of the removable non-volatile memory while the computer is online by accessing the removable non-volatile memory as a drive.

27. The computer of claim 25 wherein the removable non-volatile memory device is a compact flash.

28. A computer having a processor and a main memory, the computer comprising:
a non-removable non-volatile memory device containing a boot mechanism firmware, the boot mechanism firmware configured to provide a normal boot routine and select a first logical drive to boot from;
a user interface configured to allow a user to enter a command to run a diagnostic routine;
a removable non-volatile memory device storing the diagnostic routine, at least a portion of the removable non-volatile memory device configured as a second logical drive, the boot mechanism firmware configured to, in response to the user's command, select the second logical drive to boot from and load the diagnostic routine into main memory; and
an additional portion of the removable non-volatile memory configured to store a maintenance log generated by the diagnostic routine, wherein the additional portion of the removable non-volatile memory is an additional memory partition that is configured as a third logical drive.

29. A method for performing diagnostics on a computer having a processor and a main memory, the method comprising the steps of:
configuring a boot mechanism firmware to provide a normal boot routine;
providing a command line interface to allow a user to enter a command to interrupt the normal boot routine and run a diagnostic routine, the diagnostic routine stored on a removable non-volatile memory, at least a portion of the removable non-volatile memory device configured as a logical drive; and
selecting, in response to the user's command, the logical drive to boot from and loading the diagnostic routine into main memory;
partitioning the removable non-volatile memory device into a plurality of memory partitions such that the at least a portion of the removable non-volatile memory device is a memory partition; and
configuring an additional portion of the removable non-volatile memory as a partition to store a maintenance log generated by the diagnostic routine.

30. The method of claim 29 further comprising the step of:
modifying the contents of the removable non-volatile memory while the computer is online by accessing the removable non-volatile memory as a drive.

31. The method of claim 29 wherein the removable non-volatile memory device is a compact flash.

32. A method for performing diagnostics on a computer having a processor and a main memory, the method comprising the steps of:
configuring a boot mechanism firmware to provide a normal boot routine;
providing a user interface to allow a user to enter a command to interrupt the normal boot routine and run a diagnostic routine, the diagnostic routine stored on a removable non-volatile memory, at least a portion of the removable non-volatile memory device configured as a logical drive;
selecting, in response to the user's command, the logical drive to boot from and loading the diagnostic routine into main memory;
configuring an additional portion of the removable non-volatile memory as a partition to store a maintenance log generated by the diagnostic routine;
and
configuring the additional memory partition as a third logical drive.

33. A computer having a processor and a main memory, the computer comprising:
a non-removable non-volatile memory device containing a boot mechanism firmware, the boot mechanism firmware configured to provide a normal boot routine and select a first logical drive to boot from;
a command line interface configured to allow a user to enter a command to interrupt the normal boot routine and run a diagnostic routine;
a removable non-volatile memory device storing the diagnostic routine, a first partition of the removable non-volatile memory device configured as a second logical drive, the boot mechanism firmware configured to, in response to the user's command, select the second logical drive to boot from and load the diagnostic routine into main memory; and
a second partition of the removable non-volatile memory device designated as a maintenance log into which test results and data are stored by execution of the diagnostic routine.

34. A computer having a processor and a main memory, the computer comprising:
a boot mechanism firmware configured to provide a normal boot routine;
a removable non-volatile memory, at least a portion of the removable non-volatile memory device configured as a first logical drive and configured to store a diagnostic routine;

a command line interface configured to allow a user to enter a command to interrupt the normal boot routine the user interface configured to, in response to the user's command, select the logical drive to boot from and load the diagnostic routine into main memory and an additional portion of the removable non-volatile memory configured to store a maintenance log generated by the diagnostic routine, wherein the additional portion of the removable non-volatile memory is an additional memory partition that is configured as a third logical drive.

35. A computer having a processor and a main memory, the computer comprising:

means for providing a normal boot routine;

means for allowing a user to enter a command to interrupt the normal boot routine and run a diagnostic routine, the diagnostic routine stored on a removable non-volatile memory, at least a portion of the removable non-volatile memory device configured as a logical drive; an additional portion of the removable non-volatile memory configured to store a maintenance log generated by the diagnostic routine, wherein the additional portion of the removable non-volatile memory is an additional memory partition that is configured as a third logical drive; and means for selecting, in response to the user's command, the logical drive to boot from and loading the diagnostic routine into main memory.

36. A computer readable medium containing executable program instructions for performing diagnostics on a computer, the executable program instructions comprising program instructions for:

providing a normal boot routine;

providing a command line interface to allow a user to enter a command to interrupt the normal boot routine and run a diagnostic routine, the diagnostic routine stored on a removable non-volatile memory, at least a portion of the removable non-volatile memory device configured as a logical drive and an additional portion of the removable non-volatile memory configured to store a maintenance log generated by the diagnostic routine, wherein the additional portion of the removable non-volatile memory is an additional memory partition that is configured as a third logical drive; and selecting, in response to the user's command, the logical drive to boot from and loading the diagnostic routine into main memory.

37. The system of claim 1 further comprising:

(D) the set of boot instructions configured to boot the system from a logical drive associated with the removable nonvolatile memory device.

38. A computer having a processor and a main memory, the computer comprising:

a non-removable non-volatile memory device containing a boot mechanism firmware, the boot mechanism firmware configured to provide a normal boot routine;

a removable non-volatile memory device partitioned into a first and a second logical drive, the first logical drive storing the diagnostic routine, the boot mechanism firmware configured to select the first logical drive to boot from and load the diagnostic routine into main memory; and the second logical drive configured to store a maintenance log generated by the diagnostic routine;

wherein the boot mechanism firmware is configured to select the first logical drive upon a command generated by the computer upon a failure of the normal boot routine.

39. A method for performing diagnostics on a computer having a processor and a main memory, comprising:

configuring a boot mechanism firmware to provide a normal boot routine;

providing a removable non-volatile memory device partitioned into a first and a second logical drive, the first logical drive storing the diagnostic routine, the boot mechanism firmware configured to select the first logical drive to boot from and load the diagnostic routine into main memory;

storing a maintenance log generated by the diagnostic routine in the second logical drive; and selecting, by the boot mechanism firmware, the first logical drive upon a command generated by the computer upon a failure of the normal boot routine.

40. An apparatus to perform diagnostics on a computer having a processor and a main memory, comprising:

means for configuring a boot mechanism firmware to provide a normal boot routine;

means for providing a removable non-volatile memory device partitioned into a first and a second logical drive, the first logical drive storing the diagnostic routine, the boot mechanism firmware configured to select the first logical drive to boot from and load the diagnostic routine into main memory;

means for storing a maintenance log generated by the diagnostic routine in the second logical drive; and means for selecting, by the boot mechanism firmware, the first logical drive upon a command generated by the computer upon a failure of the normal boot routine.

41. A computer readable medium containing executable program instructions for performing diagnostics on a computer having a processor and a main memory, comprising:

configuring a boot mechanism firmware to provide a normal boot routine;

providing a removable non-volatile memory device partitioned into a first and a second logical drive, the first logical drive storing the diagnostic routine, the boot mechanism firmware configured to select the first logical drive to boot from and load the diagnostic routine into main memory; and storing a maintenance log generated by the diagnostic routine in the second logical drive; and selecting, by the boot mechanism firmware, the first logical drive upon a command generated by the computer upon a failure of the normal boot routine.

* * * * *

UNITED STATES PATENT AND TRADEMARK OFFICE
CERTIFICATE OF CORRECTION

PATENT NO. : 7,206,970 B1 Page 1 of 1
APPLICATION NO. : 10/072140
DATED : April 17, 2007
INVENTOR(S) : R. Guy Lauterbach It is certified that error appears in the above-identified patent and that said Letters Patent is hereby corrected as shown below:

Please correct Col. 1, line 10 as shown:
 patent ~~application Ser.~~ No. ~~10/071,790~~ 7,562,208 ~~filed~~ on ~~Feb. 7, 2002~~ Jul. 14, 2009

Please correct Col. 1, line 62 as shown:
 file ~~is~~ extends the quantity of data for the file, an additional Please correct Col. 8, line 10 as shown:
 the storage operating system 200 comprises a series of ~~is~~

Please correct Col. 10, line 1 as shown:
 issued as U.S. patent ~~application Ser.~~ No. ~~10/071,790 filed~~ 7,562,208 on Jul. 14, 2009

Please correct Col. 10, line 2 as shown:
 ~~on Feb. 7, 2002~~ of John Reed et al.

Please correct Col. 15, line 30 as shown:
 11. The method as defined in claim~~s~~ 9 including the Please correct Col. 20, line 51 as shown:
 into main memory; ~~and~~

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,206,970 B1 | Page 1 of 1 |
| APPLICATION NO. | : 10/072140 | |
| DATED | : April 17, 2007 | |
| INVENTOR(S) | : R. Guy Lauterbach | |

It is certified that error appears in the above-identified patent and that said Letters Patent is hereby corrected as shown below:

Please correct Col. 15, line 25 as shown:
storage <u>server</u> system are stored.

Signed and Sealed this

Twenty-first Day of December, 2010

David J. Kappos
*Director of the United States Patent and Trademark Office*